Patented May 26, 1942

2,283,976

UNITED STATES PATENT OFFICE 2,283,976

RECOVERY OF LOWER ALIPHATIC ACIDS FROM THEIR SALTS

Henry Dreyfus, London, and Walter Henry Groombridge, Spondon, near Derby, England, assignors to Celanese Corporation of America, a corporation of Delaware No Drawing. Application December 27, 1940, Serial No. 372,021. In Great Britain January 2, 1940

5 Claims. (Cl. 260—541)

This invention relates to the production of fatty acids from their salts.

In many industrial processes there are obtained solutions of metal salts of the lower fatty acids, especially of acetic acid. For example the waste liquor obtained after saponifying cellulose acetate textile materials may comprise sodium acetate or potassium acetate. It is an object of the present invention to obtain the free fatty acid from solutions of its salts.

In U. S. application S. No. 263,420, filed March 22, 1939, we have described a process in which carbon dioxide is brought into contact with a solution of a metal salt of a fatty acid in concentrated aqueous ethyl alcohol maintained at a temperature above 70° C. so as to form an acid salt of the metal from which the free acid may readily be obtained. The reaction between carbon dioxide and sodium acetate, for example, results in the precipitation of sodium bicarbonate and the formation of acid sodium acetate which remains in solution.

It is stated in the said application that the solution so obtained may be freed from sodium bicarbonate, for example by decantation, filtration or centrifuging, preferably in the cold and may then be treated to recover acetic acid from the acid acetate, for example by heating it under a fractionating column whereby a high proportion of the alcohol may be recovered substantially or nearly free from acetic acid and the residue, by being heated more strongly, caused to yield its loosely combined acetic acid.

It has now been found that by carrying out such a process under a high pressure of carbon dioxide, it is possible to form a solution containing the acid salt in such high concentration that it can be separated therefrom by crystallisation, thus avoiding the necessity of evaporating the solvent alcohol from the solution, and hence improving considerably the economics of the process.

According to the invention therefore, carbon dioxide is brought into contact with a solution of a metal salt of a fatty acid in a concentrated aqueous alcohol so as to form an acid salt of the metal from which the free acid may readily be obtained, the carbon dioxide being employed at such a pressure that the concentration of the acid acetate produced in the solvent is in excess of its solubility therein at about atmospheric temperature, and acid salt is separated from the solution by crystallisation.

The pressure of carbon dioxide employed may, in general, be in excess of 400 lbs. per square inch, and pressures of the order of 500 lbs. per square inch give very satisfactory results, although pressures up to 800 lbs. per square inch or more may be used, if desired. Naturally the concentration of the metal salt solution employed as starting material, and the temperature used in the process, are factors which influence the conversion to acid salt and hence the concentration of the latter in the solution obtained. The concentration of the metal salt solution is preferably high, and although not necessarily high enough to saturate the solvent alcohol at room temperatures, may be such that cooling of the solution a few degrees below room temperatures causes crystallisation of the salt. The reaction temperatures may most suitably be from 70–130° C., and the use of temperatures of this order, while being favourable to the reaction and making possible the production of a solution from which the acid salt can be crystallised by cooling, offers the additional advantage that it assists the precipitation of the bicarbonates produced in a form in which they are readily removable by filtration.

The alcohol used in the process should contain an amount of water at least stoichiometrically equivalent to the amount of acetate or other fatty acid salt in solution. By employing alcohol of high concentration full advantage can be taken of the insolubility of the bicarbonates in alcohol and it has been found preferable to use ethyl alcohol of at least 85% concentration and preferably higher, e. g. 90–98%. Since the alcohol serves only as a vehicle for the water and as solvent for the acetate or other fatty acid salt it may be replaced wholly or in part by other alcohols and in part by other organic liquids including hydrocarbons, e. g. benzene and paraffins and esters, e. g. methyl and ethyl acetate, so long as the fatty acid salt has a substantially greater solubility than the bicarbonate in the resultant medium and so long as the latter will dissolve necessary water.

The process can be carried out in autoclaves. For example, the solution may be passed downwards through a succession of substantially vertical towers or other vessels, up which a stream of carbon dioxide is passed under pressure as already indicated. If the solution is drawn off at a point near but not at the bottom of each tower a considerable part of the precipitated bicarbonate can be collected in the space between the draw-off and the bottom of the tower, this space thus forming a settling compartment for the precipitate. The settling compartment, which may with advantage be wider than the body of the tower, may be provided above and below with suitable valves or cocks, so that when a considerable amount of precipitate has collected this may be drawn off, together with the solution in the lower end of the tower. Such solution is preferably separated from the precipitate and returned to the process. The rest of the solution after leaving the tower may be filtered or otherwise treated to remove any bicarbonate it contains, and is then cooled to effect crystallisation of the acid salt.

After the crystallisation step, which may be carried out simply by cooling to a predetermined temperature or by cooling in stages with separation of each crop of crystals produced, the mother liquor may be returned to the process as solvent for a further quantity of the metal salt used as starting material, and when this procedure is adopted it is, of course, unnecessary to attempt to separate as much as possible of the acid salt, for instance by strong cooling during crystallisation. Indeed, strong cooling of the solution is liable to cause crystallisation of the normal salt together with the acid salt, thus adding to the bulk of the salts to be heated to obtain the free acid, and consequently to the heat needed in the process, without producing a corresponding increase in the quantity of acid produced. Preferably, therefore, the crystallisation is effected by cooling in one or more stages to about room temperature or even to a temperature a little above this, e. g. 20° C., whereafter the acid salt obtained may be freed from mother liquor by filtration, centrifuging or other operation, and decomposed to produce the normal salt and free acid, the former being returned to the process.

The metal bicarbonate produced can be used in any suitable way. Advantageously sodium or potassium bicarbonate may be heated to liberate carbon dioxide, preferably under the pressure employed in the process, and this carbon dioxide returned to the fatty acid salt solution. The carbonate remaining may, if desired, be converted into the corresponding hydroxide.

The invention is thus of particular interest in the saponification of cellulose acetate textile materials with caustic soda or potash, since it provides a simple and cheap cyclic process whereby substantially all the sodium or potassium base can be regenerated for re-use, and the acetic acid removed from the materials can be recovered. If desired, sodium acetate may be converted into potassium acetate before the treatment, so as to make use of the greater solubility of potassium acetate in aqueous alcohol. For example, potassium chloride may be added to an alcoholic solution of sodium acetate, whereby sodium chloride is precipitated, leaving potassium acetate in the solution: the proportion of sodium precipitated as chloride may be increased by evaporating off alcohol, preferably until a saturated solution of potassium acetate remains.

Although the invention has been described with particular reference to the treatment of alkali metal acetates, it may be applied to the treatment of salts of homologues of acetic acid as well as of fatty acids in which one or more hydrogen atoms are replaced by other atoms or groups. Moreover, salts of metals other than alkali metals may be treated. When treating calcium salts, for example, at temperatures of the order of 100° C., the bicarbonate first formed breaks down into the normal carbonate, setting free carbon dioxide for re-use. The calcium carbonate is readily separable from the solution by filtration.

The following example illustrates the invention as applied to the production of acetic acid from sodium acetate:

*Example*

An autoclave provided with a stirrer or with means for effecting agitation of the autoclave is charged with a solution of sodium acetate in ethyl alcohol of 92–94% concentration, the solution containing for each litre of alcohol about 250 grams of sodium acetate. Carbon dioxide is introduced into the autoclave under a pressure of 500 lbs. per square inch and the autoclave is heated to a temperature of 80° C. After 3 hours the bicarbonate precipitated is filtered off from the product and the clear liquor cooled to a temperature of about 20° C. Acid sodium acetate crystallises out and is separated from the mother liquor which is returned to the process.

The crystalline acid sodium acetate is distilled under reduced pressure and after a little alcohol and ethyl acetate is distilled pure acetic acid comes over leaving a residue of sodium acetate which is also returned to the process.

Subsequent batches in the process can be made up from the mother liquor obtained from the crystallisation of the acid sodium acetate and sodium acetate left after distillation of the acid salt together with sufficient sodium acetate to make up for that from which acetic acid has been recovered and a little alcohol to replace that left on the bicarbonate and acid acetate removed from the process. A suitable mixture is one containing for each litre of alcohol 200 grams. of normal sodium acetate and about 75 grams. of acid sodium acetate.

Having described our invention, what we desire to secure by Letters Patent is:

1. Process for the manufacture of lower aliphatic acids from their salts, which comprises bringing carbon dioxide into contact with a solution of the salt in an aqueous ethyl alcohol of 90 to 98% concentration at an elevated temperature and under high pressure so as to form the corresponding acid salt in a concentration higher than its solubility in the alcohol at atmospheric temperature, separating the acid salt by crystallization and recovering the free acid therefrom by distillation.

2. Process for the manufacture of acetic acid from alkali metal acetates, which comprises bringing carbon dioxide into contact with a solution of the acetate in an aqueous ethyl alcohol of 90 to 98% concentration at an elevated temperature and under high pressure so as to form the corresponding acid acetate in a concentration higher than its solubility in the alcohol at atmospheric temperature, separating the acid acetate by crystallization and recovering free acetic acid therefrom by distillation.

3. Process for the manufacture of lower aliphatic acids from their salts, which comprises bringing carbon dioxide into contact with a solution of the salt in an aqueous ethyl alcohol of 90 to 98% concentration at a temperature of from 70 to 130° C. and under a pressure of 400 to 800 pounds per square inch so as to form the corresponding acid salt in a concentration higher than its solubility in the alcohol at atmospheric temperature, separating the acid salt by crystallization and recovering the free acid therefrom by distillation.

4. Process for the manufacture of acetic acid from alkali metal acetates, which comprises bringing carbon dioxide into contact with a solution of the acetate in an aqueous ethyl alcohol of 90 to 98% concentration at a temperature of from 70 to 130° C. and under a pressure of 400 to 800 pounds per square inch so as to form the corresponding acid salt in a concentration higher than its solubility in the alcohol at atmospheric temperature, separating the acid salt by crystallization and recovering the free acid therefrom by distillation.

5. Process for the manufacture of acetic acid from alkali metal acetates, which comprises bringing carbon dioxide into contact with a solution of the acetate in an aqueous ethyl alcohol of 90 to 98% concentration at a temperature of from 70 to 130° C. and under a pressure of 400 to 800 pounds per square inch so as to form the corresponding acid salt in a concentration higher than its solubility in the alcohol at atmospheric temperature, separating the acid salt by crystallization by cooling to a temperature not below 20° C. the solution produced after separation of the alkali metal bicarbonate formed and recovering the free acid therefrom by distillation.

HENRY DREYFUS.
WALTER HENRY GROOMBRIDGE.